United States Patent [19]

Rosthauser et al.

[11] Patent Number: 4,940,750

[45] Date of Patent: Jul. 10, 1990

[54] CONTINUOUS PROCESS FOR THE PRODUCTION OF POWDERED POLYISOCYANATE ADDITION PRODUCTS AND THE POWDERS PRODUCED THEREFROM

[75] Inventors: James W. Rosthauser, Imperial, Pa.; Walter Meckel, Neuss, Fed. Rep. of Germany

[73] Assignees: Bayer Aktiengesellschaft, Fed. Rep. of Germany; Mobay Corporation, Pittsburgh, Pa.

[21] Appl. No.: 344,882

[22] Filed: Apr. 28, 1989

[51] Int. Cl.$^5$ ............................................. C08G 18/80
[52] U.S. Cl. ........................... 524/871; 528/44; 528/45; 528/59; 528/85; 528/902
[58] Field of Search ............... 524/871; 528/44, 45, 528/59, 85, 902

[56] References Cited

U.S. PATENT DOCUMENTS

| | | | |
|---|---|---|---|
| 3,787,525 | 1/1974 | McGarr | 260/859 |
| 3,817,886 | 1/1974 | McGarr | 260/18 |
| 3,917,741 | 11/1975 | McGarr | 260/859 |
| 3,933,759 | 1/1976 | Hoeschele | 260/77.5 |
| 3,963,710 | 6/1976 | Aufdermarsh, Jr. | 260/247.2 |
| 4,680,367 | 7/1987 | Kopp et al. | 528/44 |

*Primary Examiner*—Maurice J. Welsh
*Attorney, Agent, or Firm*—Joseph C. Gil; Thomas W. Roy

[57] ABSTRACT

The present invention is directed to a continuous process for the production of powdered polyisocyanate addition products in finely divided form which by simultaneously (a) mixing a polyisocyanate component, an isocyanate-reactive component and an inert organic medium containing a surfactant, wherein at least one of the components is insoluble in the inert organic medium, in a low shear stator-rotor dynamic mixer operating at speeds of about 300 to 8000 rpm, utilizing a mixing wattage of about 0.05 to 10.0 watts per cubic centimeter and having a mixing volume of at least about 0.1 liters and (b) reacting the polyisocyanate component with the isocyanate reactive-reactive component in the inert organic medium to form solid polyisocyanate addition products which can be separated from the inert organic medium to form a powder, the average residence time of the components and the inert organic medium in the dynamic mixer being about 3 to 300 seconds and the overall flow rate through the dynamic mixer being at least about 20 kg/h.

The present invention is also directed to the powdered polyisocyanate addition products produced by this process.

24 Claims, 1 Drawing Sheet

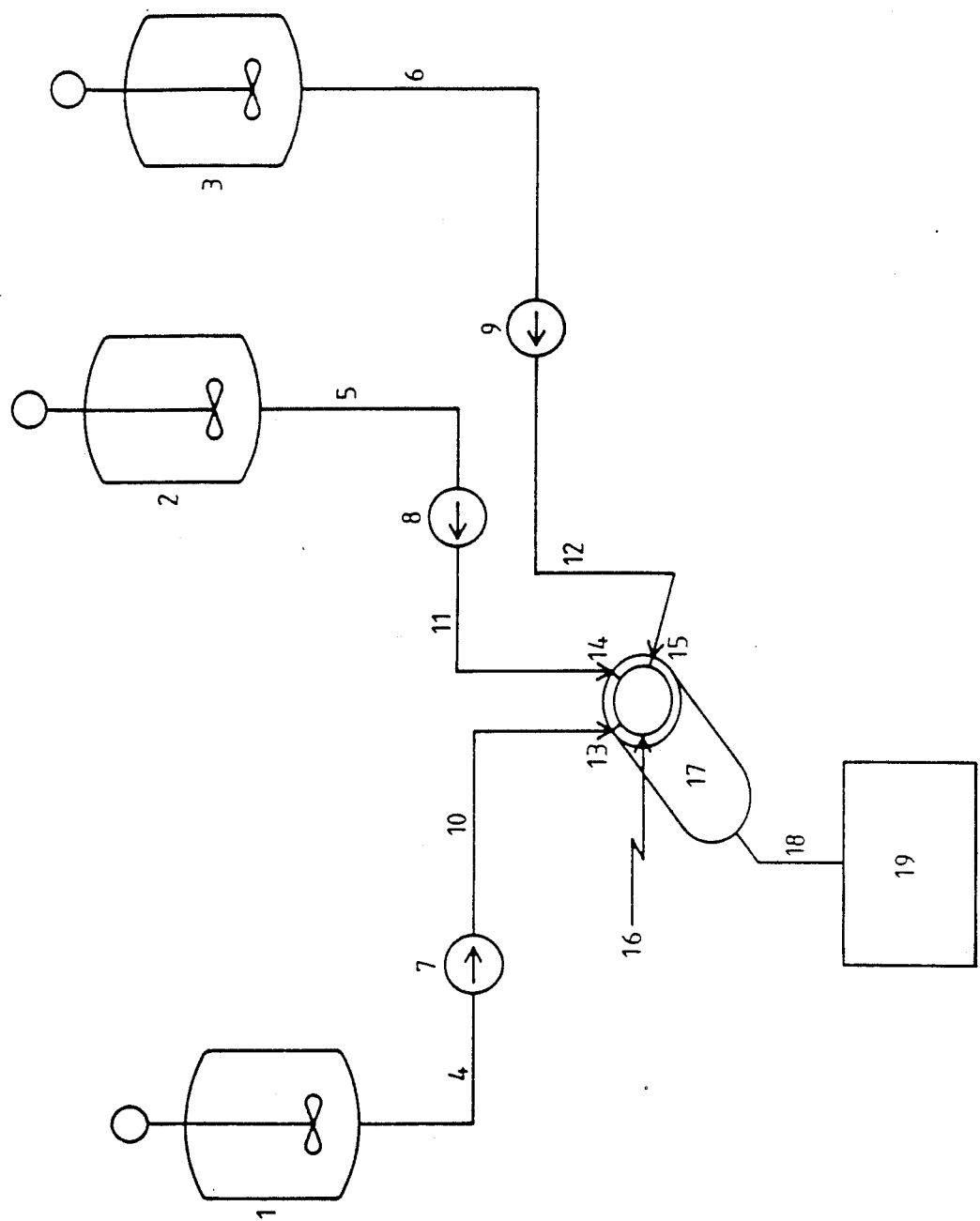

CONTINUOUS PROCESS FOR THE PRODUCTION OF POWDERED POLYISOCYANATE ADDITION PRODUCTS AND THE POWDERS PRODUCED THEREFROM

BACKGROUND OF THE INVENTION

1. Field of the Invention

The present invention is directed to a process for the production of powdered polyisocyanate addition products and to the powders produced therefrom.

2. Description of the Prior Art

The direct production of powdered polyisocyanate addition products is known as shown by U.S. Pat. Nos. 3,787,525, 3,817,886 and 3,917,741, and U.S. patent application, Ser. No. 07/336,978, which disclose thermoplastic powders based on polyisocyanate addition products, and U.S. Pat. Nos. 3,963,710 and 3,933,759, which disclose oligomers containing blocked isocyanate reactive groups. In general the powders based on polyisocyanate addition products prepared in accordance with these patents are prepared by a batch process wherein an insoluble reactant is first emulsified in an inert organic liquid and then subsequently reacted with a second soluble or insoluble reactant to form the solid reaction product.

One of the difficulties with the batch process is that the large reaction vessels required for commercial production require powerful stirring means to both emulsify the insoluble reactants into the inert organic liquid and to maintain a dispersion of the particles in the organic medium as the reaction to form the solid polyurethane takes place. In addition, the relatively slow rate of reaction of aliphatic isocyanates with hydroxyl compounds necessitates relatively long batch cycles. Further, the properties of the polyurethanes vary from batch to batch because of the complexities involved in the initial formation of the dispersed particles and the subsequent interfacial reaction of the individual components. Finally, it is often difficult to scale up a particular powder from a laboratory scale and still maintain the properties and appearance of the product as produced on the smaller scale.

Continuous processes for the production of isocyanate functional powders based on polyisocyanate addition products are known as shown by Kopp, et.al., in U.S. Pat. No. 4,680,367, issued July 14, 1987. However, this process is limited to isocyanate adducts containing urea groups.

Accordingly, it is an object of the present invention to provide a continuous process for the preparation of polyisocyanate addition products in the form of free-flowing, solid powders having properties and an appearance which are consistently reproducible. It is an additional object of the present invention to provide a continuous process which does not have the large power requirements of the known batch processes. It is also an object of the present invention to provide a continuous process for the production of powdered polyisocyanate addition products which is easy to scale up from laboratory scale to pilot plant scale and, ultimately, to commercial size production. It is a further object to provide a simple process wherein powder materials containing isocyanate functions and solely urethane (rather than urea) groups may be produced in a continuous process.

These objects may be achieved according to the present invention by using special low shear dynamic mixers as hereinafter described.

SUMMARY OF THE INVENTION

The present invention is directed to a continuous process for the production of powdered polyisocyanate addition products in finely divided form which by simultaneously (a) mixing a polyisocyanate component, an isocyanate-reactive component and an inert organic medium containing a surfactant, wherein at least one of the components is insoluble in the inert organic medium, in a low shear stator-rotor dynamic mixer operating at speeds of about 300 to 8000 rpm, utilizing a mixing wattage of about 0.05 to 10.0 watts per cubic centimeter and having a mixing volume of at least about 0.1 liters and (b) reacting the polyisocyanate component with the isocyanate reactive-reactive component in the inert organic medium to form solid polyisocyanate addition products which can be separated from the inert organic medium to form a powder, the average residence time of the components and the inert organic medium in the dynamic mixer being about 3 to 300 seconds and the overall flow rate through the dynamic mixer being at least about 20 kg/h.

The present invention is also directed to the powdered polyisocyanate addition products produced by this process.

DETAILED DESCRIPTION OF THE INVENTION

In accordance with a feature of the present invention, a dispersion of mixtures of materials which react to form solid polyisocyanate addition products in an organic solution is simultaneously formed in and allowed to react in the special mixing device. The individual reactive materials and the organic liquid medium, which is inert to the reactive materials and in which the solid reaction products are insoluble at the temperature at which the materials exit from the mixing device, are simultaneously introduced into the mixing device in the desired amounts by the use of metering pumps. At least one of the reactants is insoluble in the inert organic liquid and is emulsified as fine droplets with the aid of special surfactants which are dissolved in the inert organic liquid. The reaction proceeds rapidly at the interface of the dispersed reactant due to the presence of relatively high amounts of catalysts which are also dissolved in the inert organic liquid. The resulting polyisocyanate addition product exits the mixing device in the form of finely divided particles which have reacted to a sufficient degree such that they do not agglomerate. The solid is separated from the inert liquid medium in the form of free-flowing, spherical powder particles.

In the context of the present invention, the term "polyisocyanate addition product" defines compounds with an average of more than one urethane or urea group, preferably at least about 2 of these groups and more preferably about 2 of these groups. The term "polyurethane" defines compounds containing either urethane groups or a mixture of urethane and urea groups. Included herein are both higher molecular weight polymers and also lower molecular weight adducts of polyisocyanates and compounds containing an average of more than one isocyanate-reactive group. These lower molecular weight compounds can often contain further reactive groups; thus, many of the isocyanate-, amine-, and hydroxyl-group containing compounds known in polyurethane chemistry can be obtained in the form of finely divided powders in accordance with the present invention. Also, compounds containing latent reactive groups, for example, amine-carbonyl adducts, blocked isocyanates and other compounds which generate an isocyanate group upon heating, for example, isocyanate dimers or adducts from two-isocyanate groups and carbon dioxide, can be obtained. The main limitation on the types of polyisocyanate addition products which can be obtained by this process is that the reaction products must be solids at the temperature realized upon exit from the mixing-/reaction device.

These solid reaction products can be obtained by the continuous process herein described which involves simultaneously (a) mixing polyisocyantes with compounds containing isocyanate-reactive groups into an inert organic medium containing special surfactants and catalysts in low shear stator-rotor dynamic mixer operating at speeds of about 300 to 8000 rpm, preferably about 500 to 3000 rpm, utilizing a mixing wattage of about 0.05 to 10.0 watts per cubic centimeter, preferably 0.05 to less than 5.0 watts per cubic centimeter and more preferably 0.1 to 4.0 watts per cubic centimeter, and a mixing volume of at least about 0.1 liters, preferably about 0.1 to 25.0 liters, and more preferably about 0.5 to 5.0 liters, wherein said mixers, when arranged vertically, have levels of horizontal pins arranged in sets of at least one level of rotor pins and at least one level of stator pins such that the distance between such levels of pins is about 2 to 50 mm, preferably about 3 to 25 mm and more preferably about 4 to 20 mm, and (b) reacting the polyisocyanates with the compounds containing isocyanate-reactive groups in the inert organic medium, the average residence time of the reactive components in the inert organic medium being about 3 to 300 seconds, preferably about 5 to 200 seconds and more preferably about 10 to 100 seconds and the overall flow rate through the dynamic mixer being at least about 20 kg/h, preferably about 20 to 2000 kg/hr and more preferably about 30 to 1000 kg/hr, in such a manner that the resulting solid reaction product can thereafter either immediately be separated from the inert organic medium or further processed using conventional stirring methods.

In accordance with the present invention, a dynamic mixer is used to simultaneously disperse and react (1) polyisocyanates (such as diisocyanates or isocyanate-terminated prepolymers) which may contain other latent isocyanate functionality and (2) polyols (such as diols or higher functional hydroxyl group-containing compounds), polyamines (such as diamines or higher functional amine group-containing compounds) or mixtures thereof with other materials which are unreactive with the isocyanate or latent isocyanate functionality at the processing temperature in (3) an inert organic liquid which contains sufficient of special surfactants and catalysts to allow the isocyanate-functional and hydroxyl- or amine-functional materials to react to such a degree that the resulting polyisocyanate addition product can either directly thereafter be separated from the inert organic liquid in the relatively short period of time necessary for the materials to flow through the dynamic mixer or that the polyisocyanate addition product is in a physical state such that it no longer agglomerates and can be further processed using conventional stirring methods.

Surprisingly, these dynamic mixers are very efficient for continuously producing powders based on polyisocyanate addition products even though the prior art requires high shear mixers and considerably greater amounts of power to produce this type of product. One of the reasons for being able to obtain reproducible powders using this simultaneous mixing/reacting process is that the time which is necessary for the reaction, e.g., between the isocyanate- and hydroxyl-functional materials to take place is relatively short due to the relatively high amounts of catalysts used in the process. It is known by those skilled in the art that high amounts of catalysts can significantly accelerate the formation of urethane linkages, but the presence of these high amounts of catalysts also considerably detracts from the overall performance properties of the final product. Surprisingly, it was found that by using catalysts which have an affinity for the inert organic liquid, a considerably high amount of catalyst can be used in the formation of the urethane linkages because the catalyst primarily remains in the inert organic liquid and is thus largely separated from the final product.

Further, by using this process it is possible to prepare isocyanate-functional powders which contain solely urethane groups (which are difficult to produce by previously known methods) rather than urea groups. Relatively low molecular weight, crystalline materials can be rapidly formed and become insoluble in the inert organic liquid before forming mixtures of higher oligomers as in the previously known methods. Also, because the diisocyanates are largely soluble in the organic liquids, the major portion of the unreacted diisocyanate remains in the organic liquid and thus is separated from the final powder.

The drawing illustrates a preferred embodiment for conducting the process according to the present invention. The solution of the surfactant and catalyst in the inert organic liquid is transferred from mixing tank 1 through stream 4 by means of pump 7 which may be any pump such as a gear pump, but is preferably of a type which can be accurately controlled such as a piston pump. The pump is regulated in such a manner that a measured amount of organic solution is transferred through stream 10 into the dynamic mixer 17 through inlet port 13 which is located in a plate 16 at the entry end of the mixer. The polyisocyanate is delivered from pressurized reactor 2 through stream 5 optionally by means of pressure and by using a pump 8 which should be of a type which can be accurately controlled to transfer a measured amount of the isocyanate-functional material through stream 11 into dynamic mixer 17 through the inlet port 14 which is also located in plate 16. The compound containing isocyanate-reactive groups is transferred from pressurized reactor 3 through stream 6 optionally by means of pressure and by using a pump 9 which should be of a type which can be accurately controlled to transfer a measured amount of the isocyanate functional material through stream 12 into dynamic mixer 17 through the inlet port 15 which is also located in plate 16. All portions of the apparatus are either equipped with heating devices or are heat traced so that the reactants reach the mixing device at the desired temperatures. The three streams of materials are simultaneously metered into the plate at the entry end of the dynamic mixer in predetermined, specified amounts. They are thus mixed in appropriate amounts in the dynamic mixer where the dispersion of the insoluble polymer particles and the reaction between the polyisocyanates and isocyanate-reactive materials takes place. The dispersion of the particles exits the dynamic mixer 17 through exit stream 18 and is then transferred into container 19 where the particles are either separated from the organic solution or are held under stirring using conventional methods until the separation.

In accordance with another preferred embodiment of the present invention, either the polyisocyanate component or the isocyanate-reactive component, preferably the insoluble component, may be premixed with the inert liquid, preferably in an additional dynamic mixer.

The dynamic mixer operates on the stator-rotor principle. While the mixer does not have to be arranged vertically and may be arranged either horizontally or at other angles, it will be assumed for the purposes of this discussion that the dynamic mixer is in a vertical position, i.e., such that the rotor is vertical. The dynamic mixer contains levels of horizontal pins connected to the stator and rotor, i.e., the pins are vertically spaced in sets of at least one level of stator pins are perpendicular to the stator and rotor. The levels of pins and at least one level of rotor pins such that the distance between the level of pins within each set is about 2 to 50 mm, preferably about 3 to 25 mm and more preferably between about 4 to 20 mm. The pins are preferably arranged such that both of the adjacent levels of pins to any one level of pins are within this spacing. Most preferably, all of the levels of pins are spaced the same distance apart. In accordance with the present invention, with respect to the level of stator pins, "adjacent" refers to the next level of rotor pins above and below the level of stator pins. In other words, stator pins are "adjacent" to rotor pins and rotor pins are "adjacent" to stator pins. Each level of pins may have several pins; however, generally four pins spaced equidistantly around the stator and rotor are sufficient to ensure proper mixing.

The number of levels of pins and their order of attachment to the stator and rotor may vary, provided that they provide sufficient mixing for the formation of discreet particles of reactants in the inert organic liquid. One method of arranging the levels of pins is to have several sets of stator and rotor pins placed such that the vertical spacing between the levels of stator and rotor pins in each set is within the disclosed ranges, but where the vertical spacing between each set of pins is outside the disclosed ranges. Such an arrangement of mixing pins does not provide very efficient mixing and might require a longer mixer or greater residence time to provide sufficient mixing, but is still feasible, though not preferred. A more efficient arrangement for the level of pins is to have sets of three or more levels of pins, wherein the vertical spacing between the levels of stator and rotor pins in each set is within the disclosed ranges, while the vertical spacing between the various sets is outside the disclosed vertical spacing. This method of pin arrangement provides more efficient mixing than the method discussed previously. The most preferred method for the arrangement of the pins is for each level of mixing pins to be vertically spaced within the disclosed spacing, most preferably equidistant, from both adjacent levels of mixing pins. In other words, the spacing between a level of stator pins and both adjacent levels of rotor pins is within the disclosed spacing, preferably the same distance and the spacing between a level of rotor pins and both adjacent levels of stator pins is within the disclosed spacing, preferably the same distance. Generally, five levels of pins are sufficient to ensure proper mixing. However, the number of pins on each level and the number of levels of pins necessary for efficient mixing depends upon the length and diameter of the dynamic mixers and the flow rate required.

In accordance with another embodiment of the present invention, the levels of pins may be replaced by discs which may be thought of as a continuous level of pins. All of the preceding disclosure with regard to the arrangement of the levels of stator and rotor pins is also applicable to the levels of stator and rotor discs. Examples of suitable mixers with discs are disclosed in copending application, U.S. Ser. No. 07/190,580, filed May 5, 1988, the disclosure of which is hereby incorporated by reference in its entirety.

The dynamic mixers generally have a volume which is at least about 0.1 liters and may be as high as 50.0 liters, although dynamic mixers having a volume of about 0.1 to 25.0 liters are preferred and those having volumes of about 0.5 to 5.0 liters are especially preferred. Because of the throughputs obtainable with the dynamic mixers, it is possible to produce large quantities of products per time using dynamic mixers which are less than 5.0 liters in size. When producing even greater quantities of product per time on the larger dynamic mixers, tremendous amounts of product are produced before any adjustments can be made to the system. For instance, if the amounts of isocyanate and isocyanate reactive materials are not properly regulated, much less material is wasted in a small dynamic mixer before the system can be adjusted than when using one of the larger dynamic mixers. Accordingly, even though it is possible to use the larger dynamic mixers, they are less preferred.

The flow rates which may be achieved using the larger dynamic mixers may be as high as 50,000 kg/hr, even though these flow rates may not be feasible for other reasons. When using dynamic mixers within the preferred range of about 0.1 to 25.0 liters, the overall flow rate (total amount of materials entering or leaving the system) generally does not exceed about 2000 kg/hr.

Organic liquids for use as the continuous phase of the emulsion may be any liquid in which at least one of the reactants and the reaction product are immiscible and insoluble and which is not reactive with the reactants; i.e., not reactive with isocyanate groups or isocyanate-reactive groups normally used in the preparation of polyisocyanate addition products such as hydroxyl or amino groups. It is also preferred that the organic liquid does not cause the solid polyisocyanate addition product to swell so that the product does not have a tendency to agglomerate during the processing steps. It is desired that such liquids be volatile for removal from the reaction product by evaporation at temperatures which will not harm the product and that the boiling point be above the desired reaction temperature. Liquids with lower boiling points may be used but may require the use of pressure vessels to allow operation at the desired temperature. Liquids which are high boiling or otherwise difficult to remove from the reaction product may be removed by subsequent washing or by solvent extraction with liquids which do not harm the reaction product and which are more readily removed. Organic liquids having a boiling point or boiling range preferably between about 40° C. and about 200° C. such as hydrocarbons, halogenated hydrocarbons and ethers may be used. Hydrocarbon liquids, preferably aliphatic hydrocarbon liquids such as petroleum fractions with boiling ranges between 65° C. and 180° C., have been found desirable because of their low cost, inertness to the reactants and ease of removal from the reaction product.

Desirably, the organic liquid is used in the minimum amount necessary to maintain it as the continuous phase of the reaction system because it is a medium for manufacture and not part of the final product. On a parts by weight basis, about 25 to 99%, preferably about 40 to 90% and more preferably about 60 to 80% of the reaction system is comprised of the inert organic liquid.

In order to form fine droplets of insoluble reactant in the organic liquid phase, the degree of agitation of the reaction mixture must be sufficiently high. The dynamic mixers provide a consistently high degree of agitation with a relatively low rate of shear; mixing speeds up to about 8000 rpm can be reached. The diameter of the droplets is dependent on the degree of agitation; the higher the degree of agitation, the smaller the average diameter of the droplets.

Forming a uniform emulsion of the insoluble reactant as fine droplets with sufficient stability imposes special requirements not only on the intensity of agitation necessary during the dispersion process but also on the surfactant. In addition to chemical inertness with respect to the reactants, the surfactant must also possess exacting polarity requirements, impede the deposition of the reactants on the rotor and stator pins as well as the stator walls and meet the conflicting requirements of letting the solidified polyisocyanate addition product settle out as fine particles and also keeping the particles from agglomerating or clumping together after exiting the dynamic mixer.

The use of a surfactant which is effective to aid in forming and maintaining an emulsion of fine droplets of the insoluble reactant is of primary importance in the preparation of the powdered polyisocyanate addition products. Stable dispersions of organic solids in organic liquids can be made using surface-active agents such as bentone and other clays. It is preferred to use copolymers as surface active stabilizers. The copolymer must have a substantial molecular weight (at least 7000) to be effective. U.S. Pat. No. 3,917,741 issued to McGarr, published Nov. 4, 1975, teaches that thermoplastic powdered polyisocyanate addition products can be produced by utilizing special surfactants which are copolymers containing polar and non-polar monomers. In this patent, one part of the copolymer is solvated by the organic liquid and the other part becomes associated with the dispersed solid. The types of surfactants described in this patent have been found useful in preparing solid polyisocyanate addition products by the process described herein.

The surfactants employed in the herein described process are most preferably non-ionic surfactants of the type illustrated by the olefinlvinylpyrrolid(in)one copolymers known commercially as "Ganex" or "Antaron" V polymers (sold by General Aniline and Film Co.). These are designated by three numbers, the first number indicating the weight percent of N-vinylpyrrolid(in)one (NVP) in the copolymer, and the last two numbers indicating the chain length of the olefin; the latter being 3-20 carbons. For by weight of NVP and 50% hexadecene-1, while V-220 is a copolymer containing 20% NVP and 80% eicosene-1. These surfactants are described in more detail in U.S. Pat. No. 3,591,568 issued to Farber where they are disclosed to be useful in a suspension polymerization process for the manufacture of vinyl chloride/vinyl acetate copolymers. In the present invention "Antaron" or "Ganex" V-220 has been found to be most useful.

The amount of surfactant necessary to form and maintain a stable emulsion of droplets is dependent on a number of factors including the concentration of the solid reaction product in the continuous phase of the organic liquid, the chemical composition of the mixture of reactants and catalysts which determine the characteristics of the reaction systems, and the degree of agitation during the simultaneous emulsion and reaction steps. A higher concentration of the solid in the reacting system requires that more surfactant be present to provide a stable suspension. A higher degree of agitation can compensate for lesser amounts of surfactant and can also result in finer particle sizes when the amount of surfactant is kept constant. The diameter of the droplets of emulsified particles and thus the resulting powder can also be regulated by the amount of surfactant used to provide emulsification; the more surfactant used, the smaller the general, about 0.01 to about 20%, preferably about 0.5 to 10% and most preferably about 2 to 5% of the surfactant, based on the weight of the emulsified insoluble reactants, is used. It has been found that a considerable amount of the surfactant remains in the inert organic liquid after the solid polyisocyanate reaction product is separated from the liquid and it can be recycled and reused according to the present invention.

It is preferred that the powdered polyisocyanate addition products prepared by the process of the present invention exhibit a thermoplastic character so that they can be processed at temperatures less than about 300° C. into useful materials for a multitude of applications.

The starting materials used for the preparation of the polyisocyanate addition products are well known to those in the art and can be utilized for the preparation of powders described herein. One of the coreactants, i.e., either the polyisocyanate or the compound containing isocyanate-reactive groups, must be insoluble or immiscible in the inert organic liquid. Either the "one-shot" or the "prepolymer" preparation methods may be used.

In the context of the present invention, the "one-shot" method would involve the preparation of the powdered polyisocyanate addition product by metering measured quantities of (1) the isocyanate-reactive materials, e.g., polyols and hydroxy-functional chain extenders or amines together with (2) the polyisocyanates and (3) a solution of the surfactants and the catalysts in the organic liquid phase simultaneously into the dynamic mixer and therein forming the polyurethane. The reaction mixtures are preferably formed prior to introducing the reactants into the individual mixing tanks or, less preferably, they can be added separately by using a dynamic mixer which is equipped with more than the minimum of three inlet ports required by the present invention. Thus, all of the reactants which form the powder are simultaneously delivered to the dynamic mixer under conditions which emulsify the insoluble component(s) and dissolve the soluble component, if present, in the liquid medium and under conditions in which the reactants combine to form the solid reaction product.

In context of the present invention, the "prepolymer" method would first involve the preparation of a "prepolymer" or reactive oligomer containing isocyanate or isocyanate-reactive groups. This method is identical to the "one-shot" method with the exception that a prepolymer replaces at least a portion of either or both of the polyisocyanate component or the isocyanate-reactive component used in the "one-shot" method. The oligomers can be terminated with isocyanate or isocyanate-reactive groups. Again, (1) the solution of the inert organic liquid, (2) the polyisocyanate and (3) the isocyanate-reactive component are simultaneously metered into the dynamic mixer wherein the formation of the powdered polyisocyanate addition product takes place.

In cases where the reactants are solid at room temperature, it is possible to heat the reactants by equipping the reactors and lines leading to the pumps and to the dynamic mixer with heating devices to such a temperature that they exhibit viscosities which are low enough to allow the materials to be precisely metered and thoroughly mixed into the organic medium by the dynamic mixer. In cases where the coreactants are viscous, it is also preferred to use pressure to deliver the reactants to the pumps and ultimately to the dynamic mixer. Depending on the viscosities of the coreactants and the types of pumps and diameters of the lines used in the system, pressures of up to 10 atmospheres may be necessary. The pumps and the dynamic mixer can also be equipped with heating devices. In general, temperatures of less than about 180° C. are sufficient to allow easy transfer of the reactive materials through the system and to allow the reactions which form the solid polyisocyanate addition product to take place before the materials exit the dynamic mixer.

The method of the present invention has been found particularly useful in the manufacture of powdered polyisocyanate addition products by reacting at least one organic compound containing at least two isocyanate-reactive groups per molecule and at least one organic compound having at least two isocyanate groups per molecule. It is possible however to substitute a portion of the reactants with organic compounds containing only one of either of these groups and using them in combination with compounds having more than two of such groups. In the preparation of powdered polyisocyanate addition products of the present invention many of the reactants known from polyurethane chemistry may be used; reactants containing either two isocyanate groups or two isocyanate reactive groups are preferred. These components are set forth hereinafter.

Examples of suitable polyisocyanates to be used in preparing the powdered polyisocyanate addition products are the diisocyanates represented by the general formula

R(NCO)2 in which R is the organic group obtained by removing the isocyanate groups from an organic diisocyanate having a molecular weight of 112 to about 4000, preferably about 140 to 400. Diisocyanates preferred for the process according to the invention are those represented by the general formula indicated above in which R represents a divalent hydrocarbon group having 4 to 18 carbon atoms, a divalent cycloaliphatic hydrocarbon group having 5 to 15 carbon atoms, a divalent araliphatic hydrocarbon having 7 to 15 carbon atoms or a divalent aromatic hydrocarbon group having 6 to 15 carbon atoms. Examples of the organic diisocyanates which are particularly suitable for the process include, but are not limited to, tetramethylene diisocyanate; 1,6-hexamethylene diisocyanate; dodecamethylene diisocyanate; cyclohexane-1,3- and -1,4-diisocyanate; 1-isocyanato-3-isocyanatomethyl-3,5,5-trimethylcyclohexane (isophorone diisocyanate or IPDI); bis-(4-isocyanatocyclohexyl) methane; 2- and 4-isocyanatocyclohexyl-2'-isocyanatocyclohexyl methane; 1,3- and 1,4-bis-(isocyanatomethyl)-cyclohexane; bis-(4-isocyanato-3-methylcyclohexyl) methane; 1,3- and 1,4-tetramethylxylylidene diisocyanate; 2,4- and 2,6-diisocyanatotoluene and mixtures of these isomers; 2,2'-, 2,4'- and 4,4'-diisocyanatodiphenyl methane and mixtures of these isomers; 1,5-napthalene diisocyanate; p- and m-phenylene diisocyanate; dimeryl diisocyanate; xylylene diisocyanate; and diphenyl-4,4'-diisocyanate. These diisocyanates are soluble or miscible with many of the organic liquids used in the herein described invention.

Other polyisocyanates may be used, which depending on their structures may also be soluble in the organic liquids, although they are less preferred for the formation of the powdered polyisocyanate addition products of the present invention. Included among these are the lower molecular weight adducts of the above-mentioned diisocyanates which are well known to those skilled in the art as being useful crosslinkers in polyurethane coatings and adhesives. Examples of these adducts include, but are not limited to, the biurets, trimers or isocyanurates, and trimethlolpropane adducts of these diisocyanates, as well as the polymeric residue obtained in the manufacture of the diphenylmethane diisocyanates. Also the di- and polyisocyanates described in German Patent No. DOS 36 28 316 assigned to Sanders on Feb. 25, 1988 may be used. The polyisocyanates described in this patent with average molecular weights of 400 to about 4000 should be considered "prepolymers" in the context of the present invention. When polyisocyanates with more than two isocyanate groups per molecule are used, it is preferred to use them in combination with monomeric isocyanates or with isocyanate-reactive compounds which contain only one reactive group per molecule in order to prevent gel formation in the powdered polyisocyanate addition products. Alternatively, it is preferred to react a portion of the isocyanate group with isocyanate "blocking" groups which are well known to those skilled in the art. These blocking groups include, but are not limited to, phenol and substituted phenols; oximes, especially butanone oxime; lactams, especially c-caprolactam; acetoacetates, especially ethyl acetoacetate; and malonic esters, especially diethyl malonate. It has been found that butanoneoxime is sufficiently reactive, that it can be used as one of the "polyol" reactants for the formation of solid reaction products in the dynamic mixer.

It is also possible to incorporate a portion of fully "blocked" polyisocyanates into the reactive mixture for further reaction with the isocyanate-reactive compounds, i.e., hydroxyl or amine functional materials, which may be also built into the powdered polyisocyanate addition product. The fully "blocked" polyisocyanate is simply admixed with the coreactants, preferably the insoluble coreactant, prior to metering them into the dynamic mixing device. In these cases, the "blocked" isocyanate does not react with the isocyanate-reactive materials during the formation of the powder, but rather when the powder is used in its intended application area. Thus, the herein described process is suitable to prepare powdered polyisocyanate addition products which contain a latent isocyanate functionality for further reaction during subsequent processing of the powder.

Alternatively, it is possible to use the known polyisocyanate adducts which generate isocyanate functionality upon heating. The principle here is the same, i.e., the latent functionality does not react with the isocyanate-reactive compounds upon formation of the powdered polyisocyanate addition product, but rather upon processing the powder into a finished product. Examples of these materials include the isocyanate dimers, for example the dimers of toluene diisocyanate or IPDI, and the adduct of two moles hexamethylene diisocyanate and one mole of carbon dioxide as described in U.S. Pat. No. 3,748,329.

Examples of suitable organic compounds containing isocyanate-reactive groups for the preparation of the powdered polyisocyanate addition products or for the isocyanate-terminated prepolymers can be divided into two groups, i.e., high molecular weight compounds with molecular weights of 400 to about 8000, preferably about 800 to 5000, and low molecular weight compounds with molecular weights of 399 or less. Preferably, the reactants have two isocyanate-reactive groups. It is possible to use compounds of higher functionality in limited amounts, but it is then often necessary to include a portion of monofunctional material to assure that the powdered polyisocyanate addition products which are prepared herein retain a thermoplastic character. Examples of the high molecular weight compounds are hydroxyl-terminated polyesters, polycarbonates, polyestercarbonates, polyethers, polyethercarbonates, polyacetals, polyacrylates, polybutadienes, polyesteramides, and polythioethers. Amino-functional polyethers such as those described in U.S. Pat. No. 4,724,252 assigned to Rasshofer on Feb. 9, 1988 and German Offenlegungsschrift No. 37 13 858 as well as polyethers prepared by the amination of polyether polyols such as the commercially available products sold under the registered trademark "Jeffamine" may also be used. The polyesters, polycarbonates and polyethers are preferred.

Suitable polyester polyols include reaction products of dihydric alcohols and dibasic carboxylic acids. Instead of free dicarboxylic acids, the corresponding anhydrides or diesters of lower alcohols or mixtures thereof may be used for preparing the polyesters. The carboxylic acids may be aliphatic, cycloaliphatic, aromatic and/or heterocyclic and they may be substituted, for example, by halogen atoms, and/or unsaturated. The following are mentioned as examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as oleic acid, and dimethyl terephthalate and mixed terephthalates. Suitable dihydric alcohols include ethylene glycol; 1,3- and 1,2-propylene glycol; 1,4-, 1,3- and 2,3-butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol; polypropylene glycol; and polybutylene glycol. The polyesters may also contain a portion of carboxyl end groups. Polyesters of lactones, for example ε-caprolactone or hydroxycarboxylic acids, for example ω-hydroxycaproic acid, may also be used. Polycarbonates containing hydroxy groups include the products obtained from the reaction of diols such as 1,3-propanediol, 1,4-butanediol, 1,6-hexanediol, diethylene glycol, polyethylene glycol, polypropylene glycol and/or polytetramethylene glycol with phosgene, diaryl carbonates such as diphenylcarbonate or cyclic carbonates such as propylenecarbonate.

Suitable polyether polyols are obtained in known manner by the reaction of starting compounds which contain reactive hydrogen atoms with alkylene oxide such as ethylene oxide, propylene oxide, butylene oxide, styrene oxide, tetrahydrofuran, epichlorohydrin or with mixtures of these alkylene oxides. Suitable starting compounds containing reactive hydrogen atoms include water, bisphenol A and the dihydric alcohols set forth for preparing the polyester polyols.

The compositions may also contain low molecular weight isocyanate reactive components having a molecular weight of 399 or less. The low molecular weight compounds which may optionally be used in combination with the high molecular weight compounds for the preparation of the prepolymers include the dihydric alcohols which have been described for the preparation of the polyester polyols; aminoalcohols such as N-methyl diethanolamine and aminoethanol; and diamines such as diaminoethane, 1,6-diaminohexane, piperazine, N,N'-bis(2-aminoethyl) piperazine, diamine or IPDA), bis(4-aminocyclohexyl) methane, bis(4-amino-3-methylcyclohexyl) methane, 1,3- and 1,4- diaminocyclohexane and 1,3-diaminopropane. Amino-functional polyethers such as those described in U.S. Pat. No. 4,724,252 and German Offenlegungsschrift No. 37 13 858 as well as polyethers prepared by animating polyether polyols such as the commercially available products sold under the registered trademark "Jeffamine" may also be used. Hydrazine, amino acid hydrazides, hydrazides of semicarbazidocarboxylic acids, bis-(hydrazides) and bis-(semicarbazides) and the like may also be used. The low molecular weight dihydric alcohols are the preferred low molecular weight isocyanate-reactive compounds for preparing the prepolymers. These low molecular weight compounds containing isocyanate-reactive groups are also preferred as chain extenders for the prepolymers in the formation of the thermoplastic polyisocyanate addition products described herein; the low molecular weight dihydric alcohols are most preferred.

It is also possible to incorporate ionic groups into the powdered polyisocyanate addition products through use of low molecular weight hydroxyl or amine containing compounds. Suitable examples are well known to those skilled in the art, e.g., those disclosed in U.S. Pat. No. 4,408,008, herein incorporated by reference. Examples include sulfonate group-containing polyols such as the propoxylated adduct of potassium or sodium bisulfite with 2-butene; sulfonate group-containing amines such as the reaction product of one mole of ethylene diamine with one mole isethionic acid in the presence of a base; carboxyl group-containing compounds such as dimethylolpropionic acid neutralized with triethyl amine or other bases; or ammonium containing compounds such as quarternized or acid neutralized N-methyl diethanolamine.

It is also possible to incorporate into the powders low molecular weight amine/carbonyl adducts such as the ketimine, aldimine, and oxazolidine products known to those skilled in the art. These compounds are added to the reactive mixtures in a manner similar to that of the fully blocked isocyanates which were previously described. In these cases, the amine/carbonyl adducts do not react with isocyanate containing compounds during the preparation of the powdered polyisocyanate addition products, but rather are activated by moisture to react with isocyanate groups, which can also be built into the powders, upon subsequent processing of the powders.

It is not preferred to use mixtures of polyols and amines for reaction with the polyisocyanates in the dynamic mixer in accordance with either the one-shot or the prepolymer methods previously described. The formed ureas solidify so rapidly from the organic solution that they remove more than a stoichiometric cause a deficient amount of the isocyanate to be available for reaction with the polyol. In addition, it is not preferred to use mixtures of polyols or mixtures of polyisocyanates in which the components of each mixture have considerable differences in reactivity. For example, if polyols containing secondary hydroxyl groups, i.e., hydroxyl groups which are attached to a branched carbon atom, are used in combination with polyols containing primary hydroxyl groups, the isocyanate groups react faster with the primary hydroxyl group and can cause premature solidification of the urethane before the remaining isocyanate groups can react with the secondary hydroxyl groups. Also, it has been observed that when mixtures of higher molecular weight polyols are combined with lower molecular weight polyols, for example when polyester polyols with molecular weights greater than 1000 are combined with 1,4-butanediol, there is a tendency for the adducts of polyisocyanates with 1,4-butanediol to prematurely solidify with the result that the polyisocyanate is no longer available for reaction with the polyester. For the same reason, it is not preferred to use mixtures of isocyanates which have varying degrees of reactivity. For example, mixtures of the more reactive polyisocyanates having aromatically-bound isocyanate groups and polyisocyanates having aliphatically-bound isocyanate groups are less preferred.

In preparing the powdered polyisocyanate addition products of the present invention, the ratio of isocyanate groups to the total number of isocyanate-reactive groups should be about 0.5 to 3.0, preferably about 0.6 to 2.5 and more preferably about 0.9 to 2.0. In cases where an excess of the diisocyanate is used, it has been found that a large portion of the unreacted isocyanate remains in the organic solution and is thus easily separated from the powder.

Catalysts may be used for the preparation of the powdered polyisocyanate addition products in accordance with the process of the present invention. Catalysts are preferably used to promote the reaction between isocyanate groups and hydroxyl groups, but are generally not necessary to promote the reaction between isocyanate groups and amine groups. The catalyst is preferably added to and dissolved in the inert organic liquid prior to the time when solution is metered into the dynamic mixer. Suitable catalysts include those known in polyurethane chemistry, e.g., tertiary amines such as triethylenediamine; mercury, bismuth and lead catalysts; and especially tin catalysts such as stannous octoate and dibutyltin dilaurate. The catalysts are used in amounts of about 0.1 to 10.0% by weight, based on the total weight of the polyisocyanate addition product. The amount of catalyst is dependent upon reactivity of the individual coreactants, the temperature at which the coreactants are metered into the dynamic mixer, the temperature of the dynamic mixer, the throughput time of the reactants in the dynamic mixer and the amount of catalyst which can be tolerated in the final product.

In one embodiment of the present invention, an abnormally high amount of catalyst is necessary to produce the powdered polyisocyanate addition products in the relatively short period of time in which the reactants and the inert organic liquid pass through the dynamic mixer. Surprisingly, it was found that to a large extent, the catalyst remains in the inert organic liquid and thus can be separated from the powder by filtration and washing the powder. It is preferred that the catalysts have sufficient non-polar character that they remain in the non-polar organic solution as opposed to remaining in the final product, which exhibits a polar character. For example, a polyisocyanate addition product prepared from one mole of a polyester based on adipic acid and hexanediol with a molecular weight of 2600, one mole of butanediol and two moles of hexamethylene diisocyanate was prepared according to the process described herein in a solution containing 5.0% of dibutyl tin dilaurate; the resulting product contained only about 0.05% of dibutlytin dilaurate. The remaining catalyst contained in the inert organic liquid can be recycled for use in subsequent reactions according to the process described herein.

In many industrial applications, it is desirable to use plastic which can be pigmented to provide different colored products, rather than transparent films, foils or parts. It has been found that, in a method similar to that previously described for the fully blocked polyisocyanate adducts and amine/carbonyl adducts, inorganic or organic pigments as well as other materials such as fillers and extenders commonly used in many industrial applications, may be added to the insoluble reactants prior to their dispersion in the inert organic liquids in order to form pigmented powdered polyisocyanate addition products. The pigments which may be used in the herein described process are largely the same as those used in the manufacture of liquid coatings and inks as well as those used in the manufacture of non-transparent plastic films and foils. The only requirement is that the pigments or fillers must not be reactive with the reactants used to form the solid polyisocyanate addition products or with the organic liquid or surfactants used in the process according to the present invention. Due to their better stability in the presence of heat and light and their better resistance to weathering, the inorganic pigment types are preferred over the organic pigment types. The various forms and colors of iron oxide; the various forms of titanium dioxide; and the various carbon blacks, furnace blacks and lampblacks are preferred in accordance with the present invention.

The pigments are also often used in combination with extenders or fillers. These materials are well known to those skilled in the art. Barium sulfate or blanc fixe or barytes, bentonite, calcined and other clays, magnesium silicate or talc, mica and fumed silica are preferred. These extenders or fillers can be used in amounts of up to about 80% of the total quantity of pigments used in the present invention.

The pigment(s) and/or fillers are used in amounts up to about 50%, preferably about 0.5 to 40% and more preferably about 2 to 20%, based on the total weight of the powdered polyisocyanate addition products described herein. The pigments can be added to at least one of the reactants which is insoluble or immiscible in the organic liquid and is used to form the solid reaction product. When they are added to only one of the reactive components, in cases where more than one reactant is insoluble or immiscible in the organic liquid, they are preferably added to the reactant which comprises the higher percent by weight of the reactants which form the solid reaction product. However, they can be added to any or all of the reactants which are insoluble or immiscible.

The pigments can be added at any stage of the process before the material is polymerized to a sufficient molecular weight which would render the material solid above the boiling point of the organic liquid at the pressure used in the processing step. A limiting feature of the present invention is that pigment(s) must be added to the insoluble reactant prior to metering them into the dynamic mixer. The pigments are preferably added to the insoluble reactant at a point where the reactant has a sufficiently low viscosity to facilitate easy and thorough mixing and to completely "wet" the surface of the particles of the pigments. The pigments are also preferably added at a point in which adsorbed water and gases which are usually present on the surfaces of the particles of the pigments can be removed.

To this end, the pigments are preferably added to the isocyanate-reactive compounds, preferably the polyol reactants, used for the preparation of the powdered polyisocyanate addition products described herein. The pigments can be simply stirred into or otherwise mixed with the polyol reactant or they can preferably be "ground" into the polyol reactant by the use of extruders, high speed mixers, or so-called mills, which are known to those skilled in the art. Roll mills, sand mills, ball mills and pebble mills are a few of the types of devices which can be used. A mill with a stationary corundum disc and a rotor is quite suitable in the present invention. The displacement and removal of adsorbed water and gases on the surfaces of the pigment particles is facilitated not only during the "wetting" of the particles, but also through the "dewatering" of the polyol, which is a common practice in the preparation of urethane resins. Thus, in a preferred embodiment of the present invention, the polyol/pigments mixture is heated under vacuum prior to use in order to remove moisture and gases from both components in a single operation.

The use of leveling agents or additives with surface active properties is beneficial not only in the formation of the powdered polyisocyanate addition products, but also in their applications. These compounds can ease the "wetting" of the surfaces of the pigments by the insoluble reactants. They can also aid in the formation of regular or smooth surfaces during the application of the powdered polyisocyanate addition products onto substrates, or onto tools used in their processing into films or foils. Suitable additives are well known and include phosphate acid esters; waxes; fluorine containing compounds; polymers or copolymers containing fluorine atoms; polymeric or higher molecular weight compounds containing silicon atoms; modified bentonites or clays; and salts of fatty acid compounds or saturated fatty acid compounds such as the various stearic acid salts. These materials are used in amounts of up to about 5% by weight, based on the weight of the polyurethane powder. They are preferably added to the reactant which is insoluble in the inert organic liquid, but they can be added to any or all of the coreactants.

The addition of other additives is also possible depending on the particular end use. Plasticizers, flatting agents, antifoam agents, crosslinkers, stabilizers, etc., known to those skilled in the art may also be incorporated into the powdered polyisocyanate addition products. Up to about 10% by weight of the powdered reaction product can be comprised of these materials. They may be added to either the polyisocyanate or the isocyanate-reactive component, preferably to materials insoluble in the inert organic liquid, prior to metering them into the dynamic mixer.

The time required for the reaction to form the powdered polyisocyanate addition products varies with the reactivity of the components which make up the formed droplets, the efficiency of the catalysts and the temperature of the reaction mixture. Reaction times can be from as little as about 3 seconds for amine-isocyanate reactions to as much as several minutes for reactions of hindered alcohols with aliphatic isocyanates.

Carrying out the reactions through the dispersion of at least one of the reactive components in an inert solvent using a dynamic mixer offers a number of advantages. A high degree of agitation is provided at low shear. Good temperature control is achieved since the reaction takes place in a well-agitated liquid which also functions as a heat sink for the often exothermic reactions. The relative proportion of the reactants are more uniform because localized excessive concentrations of the reactive components are avoided. This generally results in higher molecular weight products when compared to similar products produced by other processes.

The powdered polyisocyanate addition products are obtained in spherical form which allows them to be easily separated from the organic liquid phase. The spheres have average diameters of about 1 to 1000 microns, preferably about 10 to 350 microns. The dispersion of the solid reaction product is obtained in a condition that it can either be further processed by conventional stirring devices or it can be directly passed through a filtration device. When the solid is immediately separated from the organic liquid, it is preferred to use an apparatus which operates on the principle of centrifugal forces in order to quickly remove the major portion of the organic liquid. The collected solid is washed with a fresh portion of the inert organic liquid to remove excess surfactant, catalyst, and unreacted portions of any soluble reactants which may have been used. In cases where a higher boiling liquid is used as the inert organic liquid for the reaction, it is often necessary to wash the powders with another more volatile, inert organic liquid in which the solid is insoluble to ease in drying the collected solid material. The filtrate and liquid used for washing can contain a large percent of the surfactant and catalyst and thus can beneficially be reused or recycled for further use.

Drying of the collected solid particles can be accomplished in any suitable manners such as on trays or drying screens. Procedures comparable to fluid bed drying, in which a slurry of the fine particles of the solids is suspended in contact with air or a gas which has been heated to a temperature lower than the melting or sintering temperature of the polyisocyanate addition product, are preferable. In a drying operation comparable to fluid bed drying, a dusting material to prevent agglomeration of the particles may be included in the gaseous medium for drying the finely divided product.

The powdered polyisocyanate addition products have melting or softening ranges from about 20° to 300°

C., preferably about 50° to 250° C. and more preferably about 80° to 220° C. The materials should have sufficiently high softening points to avoid the agglomeration or sintering of the particles during their preparation and isolation steps, as well as during transport and storage, yet sufficiently low melting points to ease their application onto various substrates. These two contradictory requirements are dictated by the structure of the polyisocyanate judicial selection of the starting components. The use of plasticizers to ease in processing or to provide added flexibility to the films, foils or parts formed from the powders can also be necessary depending on the end use of the final product.

The end products of the process can be used alone or in admixture with other polymers or copolymers depending upon the required property spectrum and the application envisaged for the final product. The other polymers can be either solid or liquid materials. Examples of other polymers include polyethylene, polypropylene, polyvinyl acetate, ethylene/vinyl acetate copolymers, phenolic and urea/formaldehyde resins, polyvinyl chloride and copolymers containing vinyl chloride, polystyrene, styrene/butadiene copolymers, polybutadiene, graft polymers containing styrene, acrylonitrile, ethylene and other vinyl monomers, and polyacrylates.

The end products of the process are suitable for a number of application areas. They can be dissolved in suitable coatings solvents and be applied by conventional methods known in the coatings industry. They can also be admixed with nonsolvents such as water and applied as a slurry. They can be used as coatings containing magnetic pigment particles for the manufacture of audio and video cassettes or for computer discs. They can be used as elastomeric coatings applied using powder coating techniques such as by dip coating of parts which have been preheated to above the melting or softening point of the powdered polyisocyanate addition products, by flow coating, by the various methods of electrostatic spray, by heat fusing the particles to form coatings on the surfaces of flexible substrates or by powder release coating methods. They are suitable for coating metals, ceramics, stone, concrete, bitumen, hard fibers, glass, porcelain, a variety of plastics and glass fibers.

The powdered polyisocyanate addition products containing pigments can be used as such as toners used in photocopying devices or in solution or slurries as printing inks.

They can be used as binders for glass fibers, glass mats, fiber mats, cork powder or sawdust, asbestos, woven or nonwoven textile mats or split leather. This is accomplished by mixing the solid with the material to be bound and pressing at elevated temperatures. Moldings and gasket materials can also be similarly produced from the same mixtures or with the powdered polyisocyanate addition product alone.

The powders can also be applied to a substrate and subsequently removed as a foil or film. They can be applied to smooth, porous or nonporous materials which may also have a design etched into the surface such as metals, glass, paper, cardboard, ceramic materials, sheet steel, silicon rubber or aluminum foil. The end sheet structure can be lifted off and used as such or can be applied to a substrate using the reverse coating process by bonding, flame lamination or calendering.

The powders can also be used in an in-the-mold coating process in which they are first applied to a mold and subsequently another plastic material is introduced into the mold and the finished product is then removed with a layer of the optionally pigmented, powdered polyisocyanate addition product already formed on the surface of the plastic material.

The powders can be used as hot melt adhesives or as film laminating adhesives. Solutions or slurries of the powders in suitable solvents can also be used in other adhesive applications.

The invention is further illustrated, but is not intended to be limited by the following examples in which all parts and percentages are by weight unless otherwise specified. The following materials are used in the examples:

Polyester I—a polyester based on 1,6-hexanediol and adipic acid and having an OH number of 134.

Polyester II—a polyester based on 1,6-hexanediol and adipic acid and having an OH number of 49.

Antaron—Antaron V-220 (a commercially available surfactant supplied by GAF, copolymer of 20% by weight of N-vinyl pyrrolid(in)one and 80% eicosene-1).

Stabaxol—Stabaxol 1 (a commercially available carbodiimide stabilizer supplied by Bayer A.G.).

BHT—a commercially available stabilizer, butylated hydroxy toluene.

"Leichtbenzin"—a petroleum fraction with boiling range between 68° C. and 98° C.

"Waschbenzin"—a petroleum fraction with boiling range between 108° C. and 160° C.

mill—a heated (90° C.) mill with a stationary corundum disc and a rotor (commercially available from Fryma Maschinen AG, in Rheinfelden, West Germany as Laboratory-Small-Production Mill type MK-95/R)

In the following examples, a 1.5 liter dynamic mixer was used wherein the ratio of the length of the rotor to the inner diameter is about 0.62. The rotor had 6 levels of pins, each level having 4 pins and was arranged horizontally, i.e., the rotor was horizontal. The stator had 5 levels of pins, each level having 4 pins. The numbers of the individual components of the system corresponded to those in the drawing.

EXAMPLE 1

A grey pigmented (10% pigment) thermoplastic polyurethane powder was prepared using the "prepolymer" procedure in accordance with the present invention.

A solution of 180 parts of Antaron surfactant and 180 parts of dibutyltin dilaurate in 16311 parts of "Waschbenzin" was prepared in mixing tank 1 and heated to 70° C. The solution was stirred and allowed to cool to 50° C. It was metered through lines 4 and 10 which were heated to 30° C.

A mixture consisting of 166 parts of Bayferrox 318M pigment, 834 parts of Bayertitan R-KB-2 pigment and 4000 parts of Polyester I was heated to 100° C. and stirred under vacuum for 1 hour. The molten mixture (90°–100° C.) was ground in the heated (90° C.) mill set in such a manner that the pigment particles were smaller than 20 microns after passing through the grinding mill in the 38 minute period necessary. The mixture was placed in reaction vessel 3 where it was stirred while maintaining a temperature of 90° C. It was metered through lines 5 and 11 which were also heated to 90° C.

Polyester II (2729 parts) was heated to 100° C. and stirred under vacuum to remove moisture and entrapped gases. To it were added, 7 parts of Stabaxol stabilizer, 17.6 parts of BHT and, within 2 minutes, 784.5 parts of 1,6-hexamethylene diisocyanate (25° C.). The reaction mixture was placed in reaction vessel 2 and stirred at 90° C. for 1 hour. The isocyanate content of the prepolymer was 7.96%. It was metered through lines 6 and 12 which were also heated to 90° C.

The solution of the catalyst and the surfactant in the organic liquid, the isocyanate-containing prepolymer and the pigmented polyol were pumped using gear pumps 7, 8 and 9, which were heated to the corresponding line temperatures, with flow rates of:

Organic solution: 587.3 parts/min.
Pigmented polyol: 125 parts/min.
Isocyanate prepolymer: 126.3 parts/min.

The three materials were simultaneously mixed and the polyurethane was formed in the dynamic mixer which was heated to 50° C. and in which the rotor was operated with a speed of 2855 rpm. The mixing wattage was 0.95 watts per cubic centimeter of the mixer. The materials had a residence time in the mixer of 95 seconds. The dispersion of the materials exited the mixer at a temperature of 80° C. through exit stream 18 and was stirred in post reactor 19 using a propellor type stirrer with a stirring speed of 100 rpm until it cooled to room temperature. The dispersion of the material was determined to be free from isocyanate within 10 minutes after entering the post reactor. The dispersion of the powder was filtered through a Buchner funnel and the solid was washed twice with "Leichtbenzin." The solid was again filtered and placed in a shallow dish and allowed to dry for three days under vacuum at room temperature. The free flowing powder was sieved through screens of various mesh sizes and had the physical properties listed in Table 1. Although the material was prepared using 3% catalyst, only 0.039% catalyst was found in the polyurethane powder.

A film of the material was prepared on a smooth glass plate by using a doctor blade to draw down a 1000 micron thick portion of the powder, and then allowing the powder particles to fuse together for 30 minutes at 190° C. The film had no surface defects and was removed from the glass and had the physical properties listed in Table 2.

EXAMPLE 2

A thermoplastic polyurethane powder was prepared using the "prepolymer" procedure in accordance with the present invention.

A solution of 372 parts of Antaron surfactant and 620 parts of dibutyltin dilaurate in 18610 parts of "Waschbenzin" was prepared in mixing tank 1 and heated to 70° C. The solution was stirred and allowed to cool to 30° C. It was metered through lines 4 and 10 which were heated to 100° C.

Dry 1,4-butane diol (1500 parts) was heated to 90° C. and placed in reaction vessel 3 where it was stirred while maintaining a temperature of 90° C. It was metered through lines 5 and 11 which were also heated to 90° C.

Polyester II (6618 parts) was heated to 100° C. and stirred under vacuum to remove moisture and entrapped gases. To it were added, 16 parts of Stabaxol stabilizer, 39 parts of BHT and, within 2 minutes, 960 parts of 1,6-hexamethylene diisocyanate (25° C.). The reaction mixture was placed in reaction vessel 2 and a pressure of 2.5 bar was applied to the reaction vessel by using dry nitrogen. The mixture was stirred at 90° C. for 2 hours. The isocyanate content of the prepolymer was 3.15%. It was metered through lines 6 and 12 which were also heated to 90° C.

The solution of the catalyst and the surfactant in the organic liquid, the isocyanate-containing prepolymer and the polyol were pumped using gear pumps 7, 8 and 9, which were heated to the corresponding line temperatures, with flow rates of:

Organic solution: 709 parts/min.
1,4-Butanediol: 10 parts/min.
Isocyanate prepolymer: 295.8 parts/min.

The three materials were simultaneously mixed and the polyurethane was formed in the dynamic mixer which was heated to 100° C. and in which the rotor was operated with a speed of 1200 rpm. The mixing wattage was 0.25 watts per cubic centimeter of the mixer. The materials had a residence time in the mixer of 72 seconds. The dispersion of the materials exited the mixer at a temperature of 76° C. through exit stream 18 and was stirred in post reactor 19 using a propellor type stirrer with a stirring speed of 100 rpm until it cooled to room temperature. The dispersion of the material was determined to be free from isocyanate within 2 minutes after entering the post reactor. The dispersion of the powder was filtered through a Buchner funnel and the solid was washed twice with "Leichtbenzin." The solid was again filtered and placed in a shallow dish and allowed to dry for three days under vacuum at room temperature. The free flowing powder was sieved through screens of various mesh sizes and had the physical properties listed in Table 1. Although 5% catalyst was used in the preparation of the material, only 0.053% catalyst remained in the polyurethane powder.

A film of the material was prepared on a smooth glass plate by using a doctor blade to draw down a 1000 micron thick portion of the powder, and then allowing the powder particles to fuse together for 30 minutes at 190° C. The film had no surface defects and was removed from the glass and had the physical properties listed in Table 2.

TABLE 1

| Physical Property of Powder | Example Number | |
|---|---|---|
| Diameter of spherical particle | 1 | 2 |
| % less than 100 microns | 29 | 5 |
| % between 100 and 200 microns | 68 | 13 |
| % between 200 and 315 microns | 3 | 47 |
| % between 315 and 800 microns | 0 | 34 |
| % greater than 800 microns | 0 | 1 |
| Melting Point (°C.) | 140 | 180 |
| Softening Point (°C.) | 80 | 90 |

Softening point is the point where the powder particles began to agglomerate and sinter together.

TABLE 2

| | Example Number | |
|---|---|---|
| Film Physical Property | 1 | 2 |
| Tensile strength (MPa) | 10.3 | 13.0 |
| Tensile elongation | 550 | 500 |
| Split tear (N/cm) | 569 | 623 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for the production of powdered polyisocyanate addition products in finely divided form which comprises simultaneously
  (a) mixing a polyisocyanate component, an isocyanate-reactive component and an inert organic medium containing a surfactant, wherein at least one of said components is insoluble in said inert organic medium, in a low shear stator-rotor dynamic mixer operating at speeds of about 300 to 8000 rpm, utilizing a mixing wattage of about 0.05 to 10.0 watts per cubic centimeter and having a mixing volume of at least about 0.1 liters and
  (b) reacting the polyisocyanate component with the isocyanate reactive-reactive component in the inert organic medium to form solid polyisocyanate addition products which can be separated from the inert organic medium to form a powder, the average residence time of the components and the inert organic medium in the dynamic mixer being about 3 to 300 seconds and the overall flow rate through the dynamic mixer being at least about 20 kg/h.

2. The process of claim 1 wherein said dynamic mixer operates at a speed of about 1000 to 3000 rpm.

3. The process of claim 1 wherein said dynamic mixer has a mixing wattage of 0.05 to less than 5.0 watts per cubic centimeter.

4. The process of claim 1 wherein said polyisocyanate component comprises an isocyanate-terminated prepolymer.

5. The process of claim 1 wherein one of said components contains up to about 20% by weight, based on the weight of the components, of a pigment or filler.

6. The process of claim 1 wherein one of said components contains up to about 20% by weight, based on the weight of the components, of a blocked isocyanate adduct.

7. The process of claim 1 wherein one of said components contains up to about 20% by weight, based on the weight of the components, of a blocked amine adduct.

8. The process of claim 1 wherein said polyisocyanate component is an isocyanate-terminated prepolymer containing latent isocyanate functionality.

9. The process of claim 1 wherein said polyisocyanate component comprises an aliphatic diisocyanate.

10. The process of claim 9 wherein said aliphatic diisocyanate is 1,6-hexamethylene diisocyanate.

11. The process of claim 9 wherein said isocyanate-reactive component comprises a diol with molecular weight of 399 or less.

12. The process of claim 11 wherein said diol comprises 1,4-butanediol.

13. Powdered polyisocyanate addition products in finely divided form which are prepared by a continuous process which comprises simultaneously
  (a) mixing a polyisocyanate component, an isocyanate-reactive component and an inert organic medium containing a surfactant, wherein at least one of said components is insoluble in said inert organic medium, in a low shear stator-rotor dynamic mixer operating at speeds of about 300 to 8000 rpm, utilizing a mixing wattage of about 0.05 to 10.0 watts per cubic centimeter and having a mixing volume of at least about 0.1 liters and
  (b) reacting the polyisocyanate component with the isocyanate reactive-reactive component in the inert organic medium to form solid polyisocyanate addition products which can be separated from the inert organic medium to form a powder, the average residence time of the components and the inert organic medium in the dynamic mixer being about 3 to 300 seconds and the overall flow rate through the dynamic mixer being at least about 20 kg/h.

14. The addition product of claim 13 wherein said dynamic mixer operates at a speed of about 1000 to 3000 rpm.

15. The addition product of claim 13 wherein said dynamic mixer has a mixing wattage of 0.05 to less than 5.0 watts per cubic centimeter.

16. The addition product of claim 13 wherein said polyisocyanate component comprises an isocyanate-terminated prepolymer.

17. The addition product of claim 13 wherein one of said components contains up to about 20% by weight, based on the weight of the components, of a pigment or filler.

18. The addition product of claim 13 wherein one of said components contains up to about 20% by weight, based on the weight of the components, of a blocked isocyanate adduct.

19. The addition product of claim 13 wherein one of said components contains up to about 20% by weight, based on the weight of the components, of a blocked amine adduct.

20. The addition product of claim 13 wherein said polyisocyanate component is an isocyanate-terminated prepolymer containing latent isocyanate functionality.

21. The addition product of claim 13 wherein said polyisocyanate component comprises an aliphatic diisocyanate.

22. The addition product of claim 21 wherein said aliphatic diisocyanate is 1,6-hexamethylene diisocyanate.

23. The addition product of claim 21 wherein said isocyanate-reactive component comprises a diol with molecular weight of 399 or less.

24. The addition product of claim 23 wherein said diol comprises 1,4-butanediol.

* * * * *